US012232050B2

(12) United States Patent
Guo

(10) Patent No.: US 12,232,050 B2
(45) Date of Patent: Feb. 18, 2025

(54) INFORMATION REPORTING METHOD AND APPARATUS, AND USER EQUIPMENT

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 418 days.

(21) Appl. No.: 17/563,956

(22) Filed: Dec. 28, 2021

(65) Prior Publication Data

US 2022/0201626 A1 Jun. 23, 2022

Related U.S. Application Data

(63) Continuation of application No. PCT/CN2020/108283, filed on Aug. 10, 2020.

(60) Provisional application No. 62/886,850, filed on Aug. 14, 2019.

(51) Int. Cl.
H04W 52/36 (2009.01)
H04B 7/06 (2006.01)
H04L 5/00 (2006.01)
H04W 4/00 (2018.01)
H04W 52/32 (2009.01)
H04W 72/23 (2023.01)

(52) U.S. Cl.
CPC ....... *H04W 52/365* (2013.01); *H04W 52/325* (2013.01)

(58) Field of Classification Search
None
See application file for complete search history.

(56) References Cited

U.S. PATENT DOCUMENTS 9,198,071 B2 * 11/2015 Geirhofer ............. H04L 5/0057
10,924,175 B2 * 2/2021 Wang .................. H04W 72/542
2012/0236735 A1 9/2012 Nory
2013/0183979 A1 * 7/2013 Chen ............... H04W 36/00837
455/436

(Continued)

FOREIGN PATENT DOCUMENTS

CN 102469495 A 5/2012
CN 102547954 A 7/2012

(Continued)

OTHER PUBLICATIONS

Vivo, "Discussion on RF exposure compliance in FR2", 3GPP TSG-RAN WG4 Meeting #89, R4-1815966, Spokane, US, Nov. 12-16, 2018.
Guangdong Oppo Mobile Telecom, "Uplink power control mechanism for NR", 3GPP TSG RAN WG1 Meeting NR#3, R1-1715675, Nagoya, Japan, Sep. 18-21, 2017.

(Continued)

*Primary Examiner* — Pablo N Tran
(74) *Attorney, Agent, or Firm* — Ladas & Parry LLP

(57) ABSTRACT

An information reporting method and apparatus and a user equipment (UE) are provided. A UE receives first configuration information from a network device, measures the N reference signals based on the first configuration information, selects at least one reference signal from the N reference signals, and reports information related to each of the at least one reference signal, where the first configuration information is used for determining configuration of N reference signals, and N is an integer greater than 1.

11 Claims, 5 Drawing Sheets

(56) References Cited

U.S. PATENT DOCUMENTS

| | | | | |
|---|---|---|---|---|
| 2013/0322376 A1* | 12/2013 | Marinier | ............... | H04L 5/0057 |
| | | | | 370/329 |
| 2014/0362720 A1* | 12/2014 | Kim | ...................... | H04L 5/0053 |
| | | | | 370/252 |
| 2015/0236772 A1 | 8/2015 | Hammarwall | | |
| 2018/0219664 A1* | 8/2018 | Guo | ...................... | H04W 24/10 |
| 2022/0201626 A1* | 6/2022 | Guo | .................... | H04W 52/365 |
| 2023/0037090 A1* | 2/2023 | Wang | .................... | H04W 52/58 |

FOREIGN PATENT DOCUMENTS

| | | | |
|---|---|---|---|
| WO | 2013081654 A2 | 6/2013 | |
| WO | 2014042562 A1 | 3/2014 | |

OTHER PUBLICATIONS

International Search Report in the international application No. PCT/CN2020/108283, mailed on Nov. 13, 2020.
Written Opinion of the International Search Authority in the international application No. PCT/CN2020/108283, mailed on Nov. 13, 2020.
Qualcomm Incorporated, "Measurements of power backoff requirements for DC_(n)71B with single PA", 3GPP TSG-RAN WG4 #86 R4-1802243, Feb. 26-Mar. 2, 2018 Athens, GR.
Qualcomm Incorporated, "Power Headroom Report for Rel.10", 3GPP TSG RAN WG4 #57 R4-104779, Nov. 15-19, 2010, Jacksonville, Florida, USA.
Supplementary European Search Report in the European application No. 20852521.2, mailed on Jun. 30, 2022.

* cited by examiner

INFORMATION REPORTING METHOD AND APPARATUS, AND USER EQUIPMENT

CROSS REFERENCE TO RELATED APPLICATION

This is a continuation of International Application No. PCT/CN2020/108283, filed on Aug. 10, 2020 and entitled "INFORMATION REPORTING METHOD AND APPARATUS. AND USER EQUIPMENT", which claims priority to U.S. provisional application No. 62/886,850, filed on Aug. 14, 2019 and entitled "Methods and Apparatus of DL Beam Reporting and SRS Transmission", the entirety of which is incorporated herein by reference for all purposes.

TECHNICAL FIELD

Embodiments of the present disclosure relates to mobile communication, and particularly to an information reporting method and apparatus, and a user equipment (UE).

BACKGROUND

Due to the radio frequency (RF) exposure compliance reason, a user equipment (UE) shall limit its maximal transmit power on transmit beam directions that points to human body. According to the current beam management mechanism, the optimum transmit beam cannot be selected for the UE because of the limitations on the maximal transmit power.

BRIEF DESCRIPTION OF THE DRAWINGS

The accompanying drawings described herein which form a part of the present disclosure are provided for the better understanding of the present disclosure, and exemplary embodiments of the present disclosure and description thereof serve to illustrate the present disclosure but are not to be construed as improper limitations to the present disclosure. In the accompanying drawings.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fall within the scope of protection of the present disclosure.

The technical solutions of the embodiments of the present disclosure may be applied to various communication systems, for example: Long Term Evolution (LTE) system. LTE Frequency Division Duplex (FDD) system, LTE Time Division Duplex Time Division Duplex (TDD) system, 5G communication system or future communication system, etc.

Figure 1:
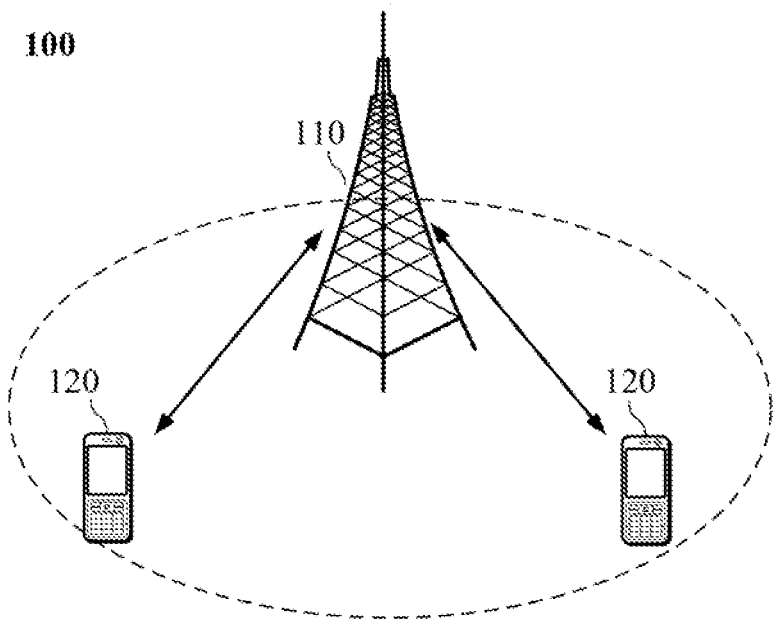
FIG. 1 illustrates a schematic diagram of a communication system architecture according to an embodiment of the present disclosure.

Exemplarily, the communication system 100 applied in the embodiment of the present disclosure is illustrated in FIG. 1. The communication system 100 may include a network device 110, and the network device 110 may be a device that communicates with a terminal 120 (or referred to as a communication terminal, or a terminal). The network device 110 can provide communication coverage for a specific geographic area, and can communicate with terminals located within the coverage area. Alternatively, the network device 110 may be an evolutionary Node B (eNB or eNodeB) in the LTE system, or a wireless controller in a cloud radio access network (Cloud Radio Access Network, CRAN), or the network device may be a mobile switching center, a relay station, an access point, an in-vehicle device, a wearable device, a hub, a switch, a bridge, a router, a network-side device in a 5G network, or a network device in a future communication system.

The communication system 100 further includes at least one terminal 120 located within the coverage of the network device 110. As used herein, "terminals" include, but are not limited to, connections via wired lines, such as via Public Switched Telephone Networks (PSTN), Digital Subscriber Lines (DSL), digital cables, and direct cable connections; and/or another data connection/network; and/or via a wireless interface, such as cellular networks, wireless local area networks (WLAN), digital TV networks such as DVB-H networks, satellite networks, AM-FM Broadcast transmitter; and/or another terminal is arranged to receive/transmit communication signals; and/or Internet of Things (IoT) equipment. A terminal configured to perform communication through a wireless interface may be referred to as a "wireless communication terminal", "wireless terminal", or "mobile terminal". Examples of mobile terminals include, but are not limited to, satellites or cellular telephones; Personal Communications System (PCS) terminals that can combine cellular radiotelephones with data processing, facsimile, and data communication capabilities; PDAs including mobile phones, pagers, Internet/internal network access, web browser, notepad, calendar, and/or Global Positioning System (GPS) receiver; conventional laptop and/or palm-type receivers; or other electronic devices including wireless transceivers. The terminal may an access terminal, a user equipment (UE), a subscriber unit, a user station, a mobile station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), or a handheld device with a wireless communication function, a computing device or other processing device connected to a wireless modem, an in-vehicle device, a wearable device, a terminals in a 5G network, or a terminal in a future evolved PLMN, and etc.

Alternatively, device-to-device (Device to Device, D2D) communication may be performed between the terminals 120.

Alternatively, the 5G communication system or 5G network may also be referred to as a New Radio (NR) system or an NR network.

FIG. 1 exemplarily illustrates one network device and two terminals. Alternatively, the communication system 100 may include multiple network devices, and each network device may include other numbers of terminals within the coverage area. Embodiments of the present disclosure make no limits on this.

Alternatively, the communication system 100 may further include other network entities such as a network controller and a mobility management entity, which is not limited in the embodiments of the present disclosure.

It should be understood that the devices with communication functions in the network/system in the embodiments of the present disclosure may be referred to as communication devices. Taking the communication system 100 illustrated in FIG. 1 as an example, the communication device may include a network device 110 and a terminal 120 having a communication function, and the network device 110 and the terminal 120 may be the specific devices described above, which will not be repeated here. The communication device may further include other devices in the communication system 100, such as network controllers, mobility management entities, and other network entities, which are not limited in the embodiments of the present disclosure.

It should be understood that the terms "system" and "network" are often used interchangeably herein. The term "and/or" in this article is just an association relationship that describes an associated object, indicating that there can be three relationships, for example, A and/or B, which can mean: A exists alone, A and B exist at the same time. B exists alone. In addition, the character "/" in this article generally indicates that the related objects before and after the character "/" have an "or" relationship.

To facilitate understanding of the technical solutions of the embodiments of the present disclosure, the technical solutions related to the embodiments of the present disclosure will be described below.

NR specifies the following methods for multi-beam operation: beam measurement and reporting, beam indication and beam switch. In downlink beam measurement and reporting, the UE is configured to measure multiple CSI-RS resources or SS/PBCH blocks. Each CSI-RS resource or SS/PBCH block can represent one gNB Tx beam. The UE measure those CSI-RS resources or SS/PBCH blocks and then report up to 4 CSI-RS resources or SS/PBCH blocks selected from those measured reference signal resources. The beam measurement and reporting is used to assist the gNB to select Tx beam for PDCCH and PDSCH transmission. For UE with beam correspondence capability, the downlink beam measurement and reporting can also help the gNB to select UE Tx beam for transmitting PUCCH and PUSCH.

As specified in release 15, the network can use one DL RS ID or UL SRS resource ID to indicate the Tx beam for a PUSCH or PUCCH transmission. A UE with beam correspondence capability can derive a Tx beam based on a Rx beam or derive a Rx beam based on a Tx beam. Thus for PUSCH or PUCCH transmission from a UE beam correspondence capability, the gNB can configure one DL CSI-RS resource or one SS/PBCH block as the information for Tx beam. The UE derives the Rx beam used to receive the indicated DL CSI-RS resource or SS/PBCH and then derive the corresponding Tx beam according the correspondence between UE Rx beam and Tx beam. To support this, downlink beam measurement and reporting is specified in release 15. The gNB first configures the UE to measure a set of $N_1$ CSI-RS resources or SS/PBCH blocks. Each CSI-RS resource or SS/PBCH block can be considered as one gNB Tx beam. UE measures the L1-RSRP of each CSI-RS resource or SS/PBCH block with paired UE Rx beam and then can select one or more CSI-RS resources or SS/PBCH blocks with the largest L1-RSRP. The UE reports the selected CSI-RS resources or SS/PBCH blocks along with the L1-RSRP to the gNB. The gNB configures one CSI-RS resource or SS/PBCH block as the spatial relation source for a PUSCH or PUCCH. To transmit the PUSCH or PUCCH, the UE use a Tx beam that corresponds to the UE Rx beam used to receive the CSI-RS resource or SS/PBCH that is configured as the spatial relation source.

For a UE without beam correspondence capability, the gNB configures a set of $N_2$ SRS resources for uplink beam management. The UE can sweep UE Tx beams over those $N_2$ SRS resources and the gNB measures those $N_2$ SRS resources to select the 'best' UE Tx beam for uplink transmission. The gNB can select the SRS resource with largest L1-RSRP. The gNB configures a SRS resource as the spatial relation source for a PUSCH or PUCCH. Then the UE use the Tx beam applied to the SRS resource configured as the spatial relation source to transmit the PUSCH or PUCCH.

Due to the radio frequency (RF) exposure compliance reason, the UE shall limit the maximal transmit power on the transmit beam directions that points to human body. The drawbacks for current design of beam management are:

Based on the DL beam measurement and reporting, the gNB can only select one Tx beam with best L1-RSRP, i.e., best pathloss and configure it to the transmission of PUSCH and PUCCH. But the maximal allowed transmit power on each UE Tx beam can not be considered. The selected Tx beam with best L1-RSRP might have great power back-off due to RF exposure compliance and thus the uplink using the configured Tx beam does not have good quality due to low Tx power.

The gNB is not able to select proper Tx beam based on measuring SRS resources for uplink beam management. When the bandwidth of SRS transmission is not large so that maximal power is not achieved, the L1-RSRP the gNB measures from those SRS resources only provide the information of pathloss of each beam pair link but not the power limitation due to RF compliance reason. The SRS resource with largest L-RSRP that is selected by the gNB might have a great power off, that would be a bad Tx beam selection for PUSCH or PUCCH with large bandwidth resource allocation or high MCS level. The gNB can configure SRS with large bandwidth to resolve this issue but the resulted drawback is large resource overhead for SRS transmission.

In view of this, the following technical schemes are proposed in embodiments of the present disclosure. In this disclosure, the methods of DL beam reporting and reporting for SRS resource are presented.

For DL beam reporting, the following methods are proposed.

Method 1: UE reports a DL beam ID and the corresponding scaled L1-RSRP that is calculated based on the L1-RSRP and power back-off value of the UE Tx beam corresponding to the DL beam.

Method 2: UE reports a DL beam ID and a corresponding value of hypothetical scaled power header room that is calculated based on the power back-off value of the UE Tx beam corresponding to the DL beam.

Method 3: the UE reports a DL beam ID, L1-RSPP and the power back-off value of the UE Tx beam corresponding to the DL beam.

For the transmission of SRS for uplink beam management, the methods include:

Method 4: for a given SRS resource, the UE reports, to the gNB, the power back-off value applied to the UE Tx beam that is used on the SRS resource.

Method 5: for a given SRS resource, the UE reports, to the gNB, the value of hypothetical scaled power header room that is calculated based on the power back-off value applied to the UE Tx beam that is used on the SRS resource.

The technical solutions of the embodiments of the present disclosure will be described in detail below.

Figure 2:
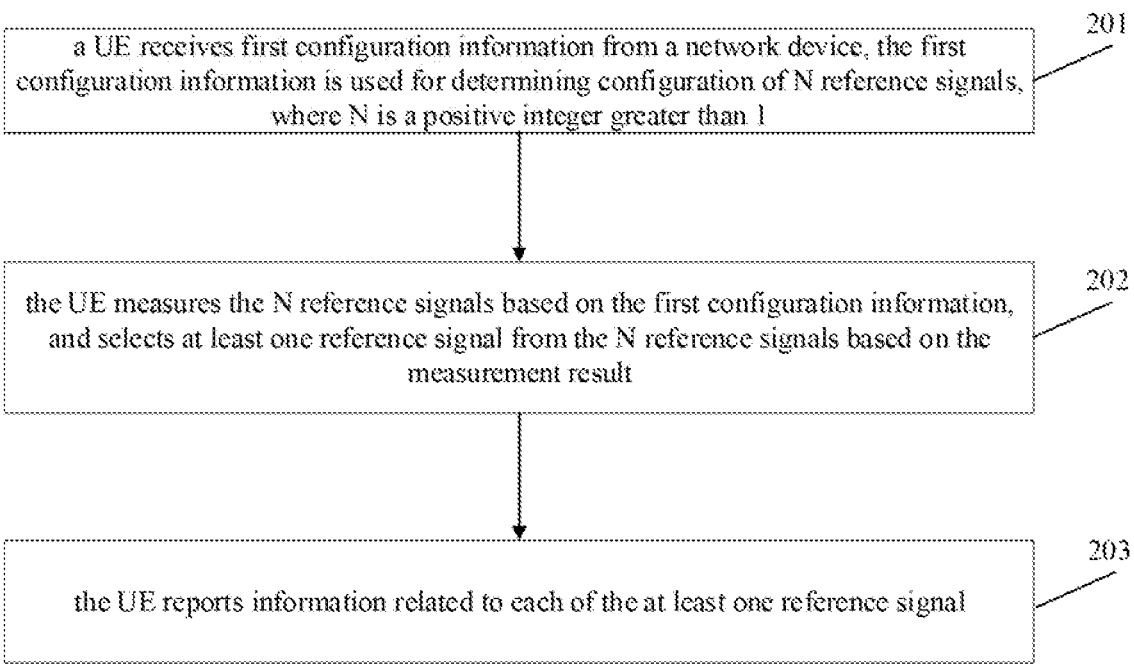
FIG. 2 illustrates a schematic flowchart of an information reporting method according to an embodiment of the present disclosure.

FIG. 2 illustrates a schematic flowchart of an information reporting method according to an embodiment of the present disclosure. As illustrated in FIG. 2, the information reporting method includes the following actions. The method begins from action 201.

In action 201, a UE receives first configuration information from a network device. The first configuration information is used for determining configuration of N reference signals, where N is a positive integer greater than 1.

In action 202, the LIE measures the N reference signals based on the first configuration information, and selects at least one reference signal from the N reference signals based on the measurement result.

In action 203, the UE reports information related to each of the at least one reference signal. The information related to each of the at least one reference signal includes a first power back-off value.

In an embodiment of the present disclosure, the network device is a base station, such as a gNB.

In an embodiment of the present disclosure, the reference signal is a CSI-RS resource or an SSB.

In an embodiment of the present disclosure, the first power back-off value is applied to a first transmit beam of the UE, the first transmit beam of the UE corresponds to the first receive beam of the UE, and the first receive beam of the UE is used for receiving and measuring the reference signal; and the information related to each of the at least one reference signal further includes at least one of the following:

identification information of the reference signal;

a first L1-RSRP value, which is an L1-RSRP value obtained by measuring the reference signal;

a second L1-RSRP value, which is determined based on the first L1-RSRP value and the first power back-off value; or a first power header room, which is determined based on the first L1-RSRP value, an EPRE of the reference signal, a UE configured maximum output power, and a first power back-off value.

Alternatively, in an embodiment, the second L1-RSRP value is determined based on the following formula:

$$RSRP_{scaled} = RSRP - \Delta P \quad (1)$$

where $RSRP_{scaled}$ is the second L1-RSRP value, RSRP is the first L1-RSRP value, and $\Delta P$ is the first power back-off value.

Alternatively, in an embodiment, the first power header room is determined based on the following formula:

$$PHR_{hypothetical} = P_{CMAX} - \Delta P - \{P_O + \alpha \times PL + f\} \quad (2\text{-}1)$$

where $PHR_{hypothetical}$ is the first power header room, $P_{CMAX}$ is a UE configured maximum output power, $\Delta P$ is the first power back-off value, $P_O$ is a nominal power level configured to the UE, PL is a path loss determined based on the first L1-RSRP value, $\alpha$ is a scaling factor of the path loss, and f is a power control adjustment state.

Alternatively, in an embodiment, the first power header room is determined based on the following formula:

$$PHR_{hypothetical} = P_{CMAX} - \Delta P - \{P_O + 10\log_{10}(2^\mu M_{RB}) + \alpha \times PL + f\} \quad (2\text{-}2)$$

where $PHR_{hypothetical}$ is the first power header room, $P_{CMAX}$ is a UE configured maximum output power, $\Delta P$ is the first power back-off value, $P_O$ is a nominal power level configured to the UE, PL is a path loss determined based on the first L1-RSRP value, $\alpha$ is a scaling factor of the path loss, f is a power control adjustment state, $M_{RB}$ is a reference bandwidth of uplink resource assignment, and $\mu$ is reference subcarrier spacing (SCS) configuration.

In the embodiments of the disclosure, the UE may report information related to each of the at least one reference signal in any of the following three manners.

Manner 1:

In an embodiment, the at least one reference signal includes K reference signals, and K is an integer greater than or equal to 1 and less than or equal to N; the UE reports the identification information and the second L1-RSRP values of the K reference signals.

In another embodiment, the at least one reference signal includes K reference signals, and K is an integer greater than 1 and less than or equal to N; among the K reference signals, the second L1-RSRP value of the first reference signal is maximum; the UE reports the identification information and the second L1-RSRP value of the first reference signal, and the identification information and the second L1-RSRP differential values of the K−1 reference signals other than the first reference signal, the second L1-RSRP differential value of the reference signal and the second L1-RSRP value of the first reference signal are used for determining the second L1-RSRP value of the reference signal.

Manner 2:

In an embodiment, the at least one reference signal includes K reference signals, and K is an integer greater than or equal to 1 and less than or equal to N; the UE reports the identification information, the first L1-RSRP values, and first power header rooms of the K reference signals.

In another embodiment, the at least one reference signal includes K reference signals, and K is an integer greater than 1 and less than or equal to N; among the K reference signals, the first L1-RSRP value of the first reference signal is maximum; the UE reports the identification information, the first L1-RSRP value, and the first power header room of the first reference signal, and the identification information, first L1-RSRP differential values, and first power header rooms of the K−1 reference signals other than the first reference signal, the first L1-RSRP differential value of the reference signal and the first L1-RSRP value of the first reference signal are used for determining the first L1-RSRP value of the reference signal.

Manner 3:

In an embodiment, the at least one reference signal includes K reference signals, and K is an integer greater than or equal to 1 and less than or equal to N; the UE reports the identification information, the first L1-RSRP values, and first power back-off values of the K reference signals.

In another embodiment, the at least one reference signal includes K reference signals, and K is an integer greater than 1 and less than or equal to N; among the K reference signals, the first L1-RSRP value of the first reference signal is maximum; the UE reports the identification information, the first L1-RSRP value, and the first power back-off value of the first reference signal, and the identification information, first L1-RSRP differential values, and first power back-off values of the K−1 reference signals other than the first reference signal, the first L1-RSRP differential value of the reference signal and the first L1-RSRP value of the first reference signal are used for determining the first L1-RSRP value of the reference signal.

The following describes the technical solutions of the embodiments of the present disclosure with specific application examples. It should be noted that in the following examples, the "first L1-RSRP value" is referred to as "L1-RSRP value", and the "second L1-RSRP value" is referred to as "scaled L1-RSRP value", and "first power header room" is referred to as "hypothetical scaled power header room".

Application Example 1

A UE is provided, by the gNB, configuration information of a set of N CSI-RS resources or N SS/PBCH blocks. The UE is configured to measure those N CSI-RS resources or N SS/PBCH blocks and the UE is configured to report the following information of one or more selected CSI-RS resources or SS/PBCH blocks from those N CSI-RS resources or N SS/PBCH blocks. For each reported CSI-RS resource or SS/PBCH block, the UE can be requested to report one or more of the following information:

An indicator of one selected CSI-RS resource or SS/PBCH block;

L1-RSRP value of the selected CSI-RS resource or SS/PBCH block;

A value that is calculated based on L1-RSRP value measured from the CSI-RS resource or SS/PBCH block and the Transmit power back-off value applied to the UE transmit beam direction that corresponds to the UE Rx beam that is used to measure and receive the selected CSI-RS resource or SS/PBCH block. It can be called a scaled L1-RSRP;

A hypothetical scaled power header room for the selected CSI-RS resource or SS/PBCH block: it is calculated by the UE based on L1-RSRP value measured from the CSI-RS resource or SS/PBCH block, the EPRE of the CSI-RS resource or SS/PBCH block, the UE configured maximum output power for uplink transmission and the power back-off value applied to the UE Tx beam direction that corresponds to the UE Rx beam that is used to measure and receive the selected CSI-RS resource or SS/PBCH block.

The power back-off value applied to the UE Tx beam direction that corresponds to the UE Rx beam used to measure and receive the selected CSI-RS resource or SS/PBCH block.

In one method, for a CSI-RS or SS/PBCH block, the UE can be requested to calculate a scaled L1-RSRP $RSRP_{scaled}$ as follows:

$$RSRP_{scaled} = RSRP - \Delta P \quad (3)$$

where RSRP is the L1-RSRP measured from the CSI-RS resource or the SS/PBCH block, $\Delta P$ is the transmit power back-off value that the UE applies to the Tx beam that corresponds to the Rx beam that is used to measure and receive the CSI-RS resource or the SS/PBCH block. The RSRP can be value in terms of dBm and $\Delta P$ can be a value in terms of dB. In one example, the UE configured maximum output power is $P_{CMAX}$ on the UE Tx beam that corresponds to the Rx beam that is used by the UE to measure and receive the CSI-RS resource or the SS/PBCH block, the maximum output power that the UE is allowed to use is $P_{CMAX\_1}$ due to RF exposure compliance reason. Then the $\Delta P$ is $\Delta P = P_{CMAX} - P_{CMAX\_1}$. The value of $\Delta P$ is zero or more than zero dB.

In one method, for a CSI-RS or SS/PBCH block, the UE can be requested to calculate a hypothetical scaled power header room $PHR_{hypothetical}$ as follows:

$$PHR_{hypothetical} = P_{CMAX} - \Delta P - \{P_O + \alpha \times PL + f\}$$

where:

$P_{CMAX}$ is the UE configured maximum output power.

$\Delta P$ is the power back-off value that the UE applies to the Tx beam that corresponds to the Rx beam that is used to measure and receive the CSI-RS resource or the SS/PBCH block.

$P_O$ is a nominal power level configured to the UE. In one example, $P_O$ can be equal to $P_{O\_PUSCH,b,f,c}$. In another example, $P_O$ can be equal to $P_{O\_PUCCH,b,f,c}$.

PL is the pathloss calculated from the CSI-RS resource or SS/PBCH block.

For the CSI-RS resource, the PL is calculated as: $PL = P_{CSI-RS} - RSRP_{CSI-RS}$, where $P_{CSI-RS}$ is the transmit power of CSI-RS resource that is calculated based on the SS/PBCH block downlink transmit power given by the parameter ss-PBCH-BlockPower and CSI-RS power offset given by the parameter powerControlOffsetSS provided by higher layers and $RSRP_{CSI-RS}$ is the RSRP measured from the CSI-RS resource.

For the SS/PBCH block, the PL is calculated as: $PL = P_{SSB} - RSRP_{SSB}$, where $P_{SSB}$ is the transmit power of the SS/PBCH block that is calculated based on the SS/PBCH block downlink transmit power given by the parameter ss-PBCH-BlockPower provided by higher layers and $RSRP_{SSB}$ is the RSRP measured from the SS/PBCH block.

$\alpha$ is the pathloss scale factor. In one example, $\alpha$ can be equal to the value of $\alpha_{b,f,c}$ configured to PUSCH transmission. In one example, $\alpha$ can be equal to 1.

f is a power control adjustment state. In one example, f can be equal to the value of $f_{b,f,c}$ configured to the PUSCH. In one example, f can be equal to the value of $g_{b,f,c}$ configured to PUCCH transmission.

In another method, for a CSI-RS or SS/PBCH block, the UE can be requested to calculate a hypothetical scaled power header room $PHR_{hypothetical}$ as follows:

$$PHR_{hypothetical} = P_{CMAX} - \Delta P - \{P_O + 10 \log_{10}(2^\mu M_{RB}) + \alpha \times PL + f\}$$

where $M_{RB}$ is a reference bandwidth of uplink resource assignment expressed in number resource blocks for an uplink transmission and $\mu$ is reference SCS configuration that is configured to the UE for the UE to calculate $PHR_{hypothetical}$.

In a first method (corresponding to manner 1 described above), the UE can be requested to measure a set of N CSI-RS resources (or SS/PBCH blocks) and then report K≥1 CRI (CSI-RS resource indicator) (or SSBRI SS/PBCH block indicator) and the scaled L1-RSRP of the reported CRI (or SSBRI). If K>1, the UE reports: one CRI (or SSBRI) with the largest scaled L1-RSRP and the corresponding scaled L1-RSRP, and K−1 CRIs (or SSBRIs) and the corresponding differential scaled L1-RSRP that is calculated with a reference to the largest scaled L1-RSRP.

In a second method (corresponding to manner 2 described above), the UE can be requested to measure a set of N CSI-RS resources (or SS/PBCH blocks) and then report K≥1 CRI (CSI-RS resource indicator) (or SSBRI SS/PBCH block indicator) and the L1-RSRP and hypothetical scaled power header room of the reported CRI (or SSBRI). If K>1, the UE reports: one CRI (or SSBRI) with the largest L1-RSRP and the corresponding L1-RSRP and hypothetical scaled power header room, and K−1 CRIs (or SSBRIs) and the corresponding differential L1-RSRP that is calculated with a reference to the largest L1-RSRP and corresponding hypothetical scaled power header room. The hypothetical scaled power header room is calculated by the UE based on (1) the UE configured maximum output power $P_{CMAX}$, (2) the power back-off value the UE shall apply to the spatial domain transmit filter that corresponds to the spatial domain receive filter used to receive the CSI-RS resource (or SS/PBCH block) indicated by the reported CRI (or SSBRI), (3) the path loss calculated from the CSI-RS resource (or SS/PBCH block) indicated by the reported CRI (or SSBRI).

In a third method (corresponding to manner 3 described above), the UE can be requested to measure a set of N CSI-RS resources (or SS/PBCH blocks) and then report K≥1 CRI (CSI-RS resource indicator) (or SSBRI SS/PBCH block indicator), the L1-RSRP and power back-off value of the reported CRI (or SSBRI). If K>1, the UE reports: one CRI (or SSBRI) with the largest L1-RSRP and the corresponding L1-RSRP and power back-off value, and K−1 CRIs (or SSBRIs) and the corresponding differential L1-RSRP that is calculated with a reference to the largest L1-RSRP and corresponding power back-off value. The power back-off value is the power back-off value the UE shall apply to the spatial domain transmit filter that corresponds to the spatial domain receive filter used to receive the CSI-RS resource (or SS/PBCH block) indicated by the reported CRI (or SSBRI).

For the above UE reporting, we have the following alternatives:
- the UE is configured with new CSI reporting quantity that indicates the UE to report those values. In one example, the UE is configured with a CSI-ReportConfig with the higher layer parameter reportQuantity set to 'cri-scaled-RSRP' to indicate the UE to report as described in the first method. In one example, the UE is configured with a CSI-ReportConfig with the higher layer parameter reportQuantity set to 'cri-RSRP-hypoPHR' to indicate the UE to report as described in the second method. In one example, the UE is configured with a CSI-ReportConfig with the higher layer parameter reportQuantity set to 'cri-RSRP-PBF' to indicate the UE to report as described in the third method.
- The UE can be requested by the gNB to report the values for one indicated CSI-RS resource or SS/PBCH block. The gNB sends the ID of one CSI-RS resource or SS/PBCH block to the UE and request the UE to report the scaled L1-RSRP or hypothetical scaled power header room or the power back-off value of the indicated CSI-RS resource or SS/PBCH block.

Figure 3:
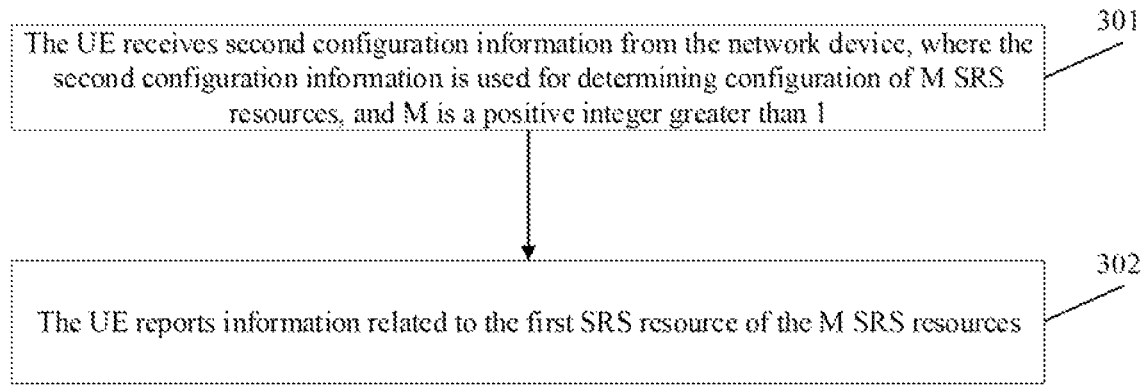
FIG. 3 illustrates a schematic flowchart of an information reporting method according to another embodiment of the present disclosure.

FIG. 3 illustrates a schematic flowchart of an information reporting method according to another embodiment of the present disclosure. As illustrated in FIG. 3, the information reporting method includes the following actions. The method begins from action 301.

In action 301, the UE receives second configuration information from the network device, where the second configuration information is used for determining configuration of M SRS resources, and M is a positive integer greater than 1.

In action 302, the UE reports information related to the first SRS resource of the M SRS resources. The information related to the first SRS resource comprises a first power back-off value.

In an embodiment of the present disclosure, the network device is a base station, such as a gNB.

In an embodiment of the present disclosure, the first power back-off value is applied to a first transmit beam of the UE, wherein the first transmit beam is used for transmission of the first SRS resource, and the information related to the first SRS resource includes at least one of the following:
  identification information of the first SRS resource; or
  a first power header room, where the first power header room is determined based on a path loss, a UE configured maximum output power, and a first power back-off value.

In an embodiment, the first power header room is determined based on the following formula:

$$PHR_{hypothetical}=P_{CMAX}-\Delta P-\{P_O+\alpha\times PL+h\} \qquad (4)$$

where $PHR_{hypothetical}$ is the first power header room, $P_{CMAX}$ is a UE configured maximum output power, $\Delta P$ is the first power back-off value, and $P_O$ is a nominal power level configured to the UE, PL is a path loss determined based on the first L1-RSRP value, $\alpha$ is a scaling factor of the path loss, and h is an uplink power adjustment parameter.

Alternatively, in an embodiment, before the UE reports information related to the first SRS resource of the M SRS resources, the method further includes that, the UE receives a request message from the network device, where the request message is used by the UE to report a first power back-off value and/or a first power header room for the first SRS resource.

In the embodiment of the present disclosure, the UE's reporting of the information related to the first SRS resource of the M SRS resources may be implemented in one of the following manners.

Manner 4:

In an embodiment, the UE reports the identification information and the first power back-off value of the first SRS resource.

Manner 5:

In an embodiment, the UE reports the identification information and the first power header room of the first SRS resource.

The following describes the technical solutions of the embodiments of the present disclosure with specific disclosure examples. It should be noted that in the following examples, the "first power header room" is referred to as "hypothetical scaled power header room".

Application Example 2 a UE is provided, by the gNB, configuration information of a set of M SRS resources for uplink beam management. On each of those M SRS resource, the UE can apply a transmit beam (or called spatial domain transmit filter). The UE can be requested to report one or more of the following information for one SRS resource for uplink beam management:

The ID of the SRS resource;

The power back-off value that is applied to the UE transmit beam that is applied to the reported SRS resource;

A hypothetical scaled power header room for the SRS resource: it is calculated by the UE based on the downlink pathloss, the UE configured maximum output power for uplink transmission and the power back-off value applied to the UE transmit beam direction that is applied to the reported SRS resource;

In one method, the UE is provided, by the gNB, configuration information of an SRS resource set for uplink beam management and there are M≥1 SRS resources in the set. In the configuration of the SRS resource set, the higher layer parameter usage is set to beamManagement to indicate the SRS resources configured in the set is for uplink beam management. For a first SRS resource in the set, the UE can be requested to report transmit power back-off value that is applied to the spatial domain transmit filter that is used on the transmission on the first SRS resource.

In one example, the UE configured maximum output power is $P_{CMAX}$. On the UE Tx beam (i.e., the spatial domain transmit power) that is applied by the UE on the transmission on the first SRS resource, the maximum output power that the UE is allowed to use is $P_{CMAX\_1}$ due to RF exposure compliance reason. Then the $\Delta P$ is $\Delta P = P_{CMAX} - P_{CMAX\_1}$. The value of $\Delta P$ is zero or more than zero dB.

Figure 4:
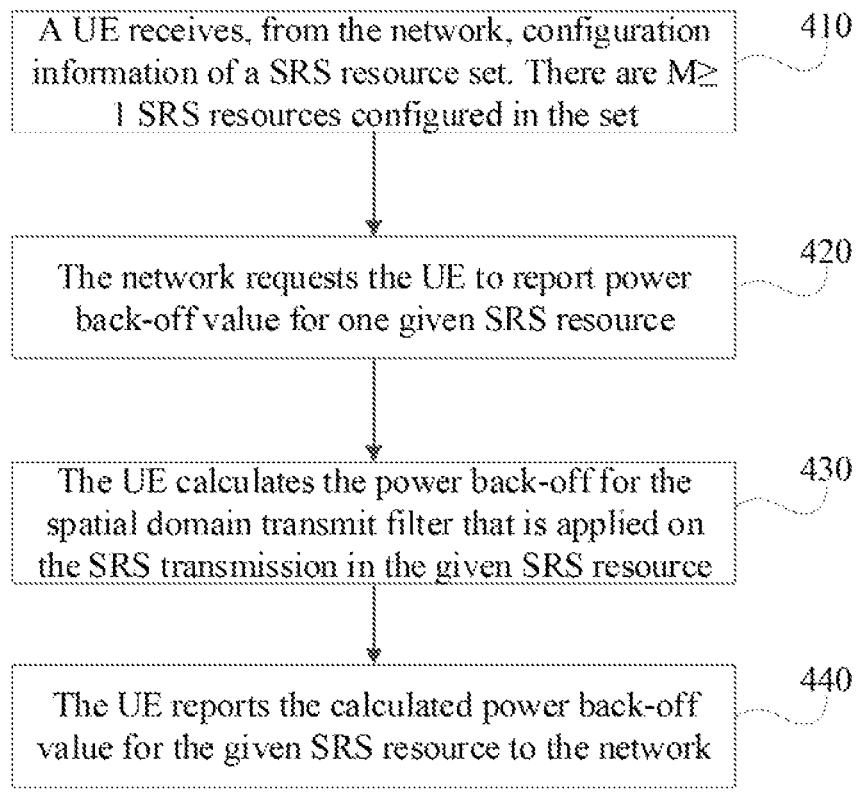
FIG. 4 illustrates a schematic flowchart of an information reporting method according to yet another embodiment of the present disclosure.

FIG. 4 illustrates a procedure of UE reporting power back-off for SRS resource according the method presented in this disclosure.

As illustrated in FIG. 4, a UE receives, from the network, configuration information of a SRS resource set in 410. In the configured SRS resource set, there are M≥1 SRS resources. In 420, the NW sends signaling to request the UE to report power back-off value for a given SRS resource. Then in 430, the UE calculates the power back-off value for the spatial domain transmit filter (i.e., Tx beam) that is applied on the SRS transmission in the given SRS resource. In 440, the UE reports the calculated power back-off value for the given SRS resource to the NW.

In one method, the UE is provided, by the gNB, configuration information of an SRS resource set for uplink beam management and there are M≥1 SRS resources in the set. In the configuration of the SRS resource set, the higher layer parameter usage is set to beamManagement to indicate the SRS resources configured in the set is for uplink beam management. For a first SRS resource in the set, the UE can be requested to report a hypothetical scaled power header room that is calculated as:

$$PHR_{hypothetical} = P_{CMAX} - \Delta P - \{P_O + \alpha \times PL + h\}$$

where:

$P_{CMAX}$ is the UE configured maximum output power.

$\Delta P$ is the power back-off value that the UE applies to the Tx beam (i.e., spatial domain transmit filter) that is applied to the SRS transmission in the first SRS resource.

$P_O$ is a nominal power level configured to the UE. In one example, $P_O$ can be equal to $P_{O\_SRS,b,f,c}$, PL is the pathloss calculated from the pathloss reference SRS ID configured to the SRS set.

$\alpha$ is the pathloss scale factor. In one example, a can be equal to the value of $\alpha_{SRS,b,f,c}$ configured to the SRS set.

h is the uplink power adjustment parameter.

Figure 5:
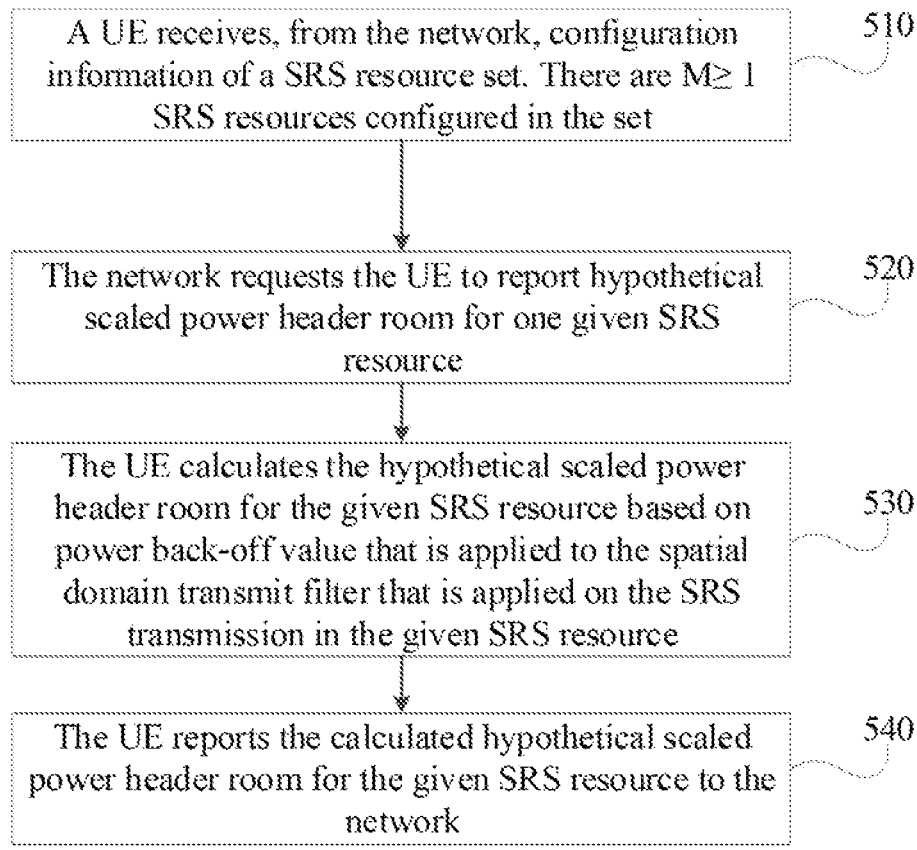
FIG. 5 illustrates a schematic flowchart of an information reporting method according to yet another embodiment of the present disclosure.

FIG. 5 illustrates a procedure of UE reporting hypothetical scaled power header room for SRS resource according an embodiment of the present disclosure.

As illustrated in FIG. 5, a UE receives, from the network, configuration information of a SRS resource set in 510. In the configured SRS resource set, there are M≥1 SRS resources. In 520, the NW sends signaling to request the UE to report hypothetical scaled power header room for a given SRS resource. Then in 530, the UE calculates the hypothetical scaled power header room for the given SRS resource based on the power back-off value for the spatial domain transmit filter (i.e., Tx beam) that is applied on the SRS transmission in the given SRS resource. In 540, the UE reports the calculated hypothetical scaled power header room value for the given SRS resource to the NW.

The proposed methods in the present disclosure enable the gNB to select a Tx beam that has the best combination of maximally allowed transmit power and pathloss of beam pair link for a PUSCH and PUCCH transmission. Thus, the drawback of bad link quality caused by configuring a Tx beam with good pathloss but large power back-off can be resolved by the proposed method.

Figure 6:
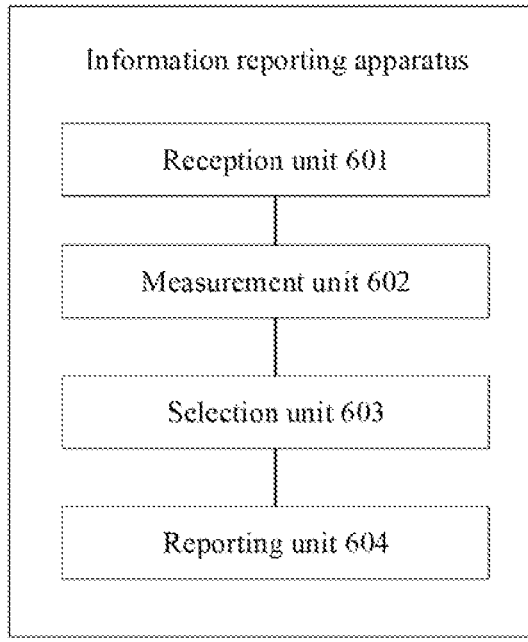
FIG. 6 illustrates a schematic structural diagram of an information reporting apparatus according to an embodiment of the present disclosure.

FIG. 6 illustrates a schematic structural diagram of an information reporting apparatus according to an embodiment of the present disclosure. The apparatus is applied to a UE. As illustrated in FIG. 6, the information reporting device includes a reception unit 601, a measurement unit 602, a selection unit 603, and a reporting unit 604.

The reception unit 601 is configured to receive first configuration information from a network device, where the first configuration information is used for determining configuration of N reference signals, and N is a positive integer greater than 1.

The measurement unit 602 is configured to measure the N reference signals based on the first configuration information.

The selection unit 603 is configured to select at least one reference signal from the N reference signals based on the measurement result.

The reporting unit 604 is configured to report information related to each of the at least one reference signal. The information related to each of the at least one reference signal includes a first power back-off value.

In an embodiment, the first power back-off value is applied to a first transmit beam of the UE, the first transmit beam of the UE corresponds to the first receive beam of the UE, and the first receive beam of the UE is used for receiving and measuring the reference signal; and the information related to each of the at least one reference signal further includes at least one of the following:

identification information of the reference signal;

a first L1-RSRP value, which is an L1-RSRP value obtained by measuring the reference signal;

a second L1-RSRP value, which is determined based on the first L1-RSRP value and the first power back-off value; and a first power header room, which is determined based on the first L1-RSRP value, an EPRE of the reference signal, a UE configured maximum output power, and a first power back-off value.

Alternatively, in an embodiment, the second L1-RSRP value is determined based on the following formula:

$$RSRP_{scaled} = RSRP - \Delta P$$

where $RSRP_{scaled}$ is the second L1-RSRP value, RSRP is the first L1-RSRP value, and $\Delta P$ is the first power back-off value.

Alternatively, in an embodiment, the first power header room is determined based on the following formula:

$$PHR_{hypothetical} = P_{CMAX} - \Delta P - \{P_O + \alpha \times PL + f\}$$

where $PHR_{hypothetical}$ is the first power header room, $P_{CMAX}$ is a UE configured maximum output power, $\Delta P$ is the first power back-off value, $P_O$ is a nominal power level configured to the UE, PL is a path loss determined based on the first L1-RSRP value, $\alpha$ is a scaling factor of the path loss, and f is a power control adjustment state.

Alternatively, in an embodiment, the first power header room is determined based on the following formula:

$$PHR_{hypothetical} = P_{CMAX} - \Delta P - \{P_O + 10 \log_{10}(2^\mu M_{RB}) + \alpha \times PL + f\}$$

where $PHR_{hypothetical}$ is the first power header room, $P_{CMAX}$ is a UE configured maximum output power, $\Delta P$ is the first power back-off value, $P_O$ is a nominal power level configured to the UE, PL is a path loss determined based on the first L1-RSRP value, $\alpha$ is a scaling factor of the path loss, f is a power control adjustment state, $M_{RB}$ is a reference bandwidth of uplink resource assignment, and $\mu$ is reference subcarrier spacing (SCS) configuration.

Alternatively, in an embodiment, the at least one reference signal includes K reference signals, where K is an integer greater than or equal to 1 and less than or equal to N.

The reporting unit 604 is configured to report the identification information and the second L1-RSRP value of the K reference signals.

Alternatively, in an embodiment, the at least one reference signal includes K reference signals, and K is an integer greater than 1 and less than or equal to N; among the K reference signals, the second L1-RSRP value of the first reference signal is maximum.

The reporting unit 604 is configured to report the identification information and the second L1-RSRP value of the first reference signal, and identification information and a second L1-RSRP differential values of the K−1 reference signals of the K reference signals other than the first reference signal. The second L1-RSRP differential value of the reference signal and the second L1-RSRP value of the first reference signal are used for determining the second L1-RSRP value of the reference signal.

Alternatively, in an embodiment, the at least one reference signal includes K reference signals, and K is an integer greater than or equal to 1 and less than or equal to N;

The reporting unit 604 is configured to report the identification information, the first L1-RSRP values and the first power header rooms of K reference signals.

Alternatively, in an embodiment, the at least one reference signal includes K reference signals, and K is an integer greater than 1 and less than or equal to N; among the K reference signals, the first L1-RSRP value of the first reference signal is maximum.

The reporting unit 604 is configured to report the identification information, the first L1-RSRP value, and the first power header room of the first reference signal, and identification information, the first L1-RSRP differential value, and the first power header rooms of K−1 reference signals of the K reference signals other than the first reference signal. The first L1-RSRP differential value of the reference signal and the first L1-RSRP value of the first reference signal are used for determining the first L1-RSRP value of the reference signal.

Alternatively, in an embodiment, the at least one reference signal includes K reference signals, and K is an integer greater than or equal to 1 and less than or equal to N:

The reporting unit 604 is configured to report the identification information, the first L1-RSRP values and the first power back-off values of K reference signals.

Alternatively, in an embodiment, the at least one reference signal includes K reference signals, and K is an integer greater than 1 and less than or equal to N; among the K reference signals, the first L1-RSRP value of the first reference signal is maximum.

The reporting unit 604 is configured to report the identification information, the first L1-RSRP value and the first power back-off value of the first reference signal, and identification information, the first L1-RSRP differential value, and the first power back-off values of K−1 reference signals of the K reference signals other than the first reference signal. The first L1-RSRP differential value of the reference signal and the first L1-RSRP of the first reference signal are used for determining the first L1-RSRP value of the reference signal.

Alternatively, in an embodiment, the reference signal is a CSI-RS resource or an SSB.

Those skilled in the art should understand that the relevant description of the foregoing information reporting device in the embodiment of the present disclosure can be understood with reference to the relevant description of the information reporting method in the embodiment of the present disclosure.

Figure 7:
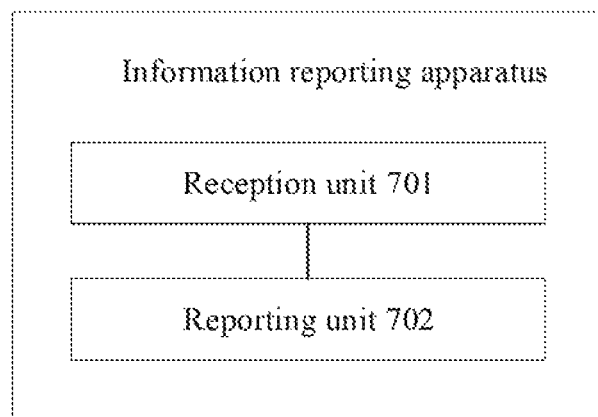
FIG. 7 illustrates a schematic structural diagram of an information reporting apparatus according to another embodiment of the present disclosure.

FIG. 7 illustrates a schematic structural diagram of an information reporting apparatus according to another embodiment of the present disclosure. The apparatus is applied to a UE. As illustrated in FIG. 7, the information reporting device includes a reception unit 701 and a reporting unit 702.

The reception unit 701 is configured to receive second configuration information from a network device, where the second configuration information is used for determining configuration of M SRS resources, and M is a positive integer greater than 1.

The reporting unit 702 is configured to report information related to the first SRS resource of the M SRS resources. The information related to the first SRS resource comprises a first power back-off value.

Alternatively, in an embodiment, the first power back-off value is applied to a first transmit beam of the UE, wherein the first transmit beam is used for transmission of the first SRS resource, and the information related to the first SRS resource includes at least one of the following:

identification information of the first SRS resource; or a first power header room, which is determined based on a path loss, a UE configured maximum output power, and the first power back-off value.

Alternatively, in an embodiment, the first power header room is determined based on the following formula:

$$PHR_{hypothetical} = P_{CMAX} - \Delta P - \{P_O + \alpha \times PL + h\}$$

where $PHR_{hypothetical}$ is the first power header room, $P_{CMAX}$ is a UE configured maximum output power, $\Delta P$ is the first power back-off value, and $P_O$ is a nominal power level configured to the UE, PL is a path loss determined based on the first L1-RSRP value, $\alpha$ is a scaling factor of the path loss, and h is an uplink power adjustment parameter.

Alternatively, in an embodiment, the reception unit 701 is further configured to receive a request message from the network device, where the request message is used by the UE to report a first power back-off value and/or the first power header room for the first SRS resource.

Those skilled in the art should understand that the relevant description of the foregoing information reporting device in the embodiment of the present disclosure can be understood with reference to the relevant description of the information reporting method in the embodiment of the present disclosure.

Figure 8:
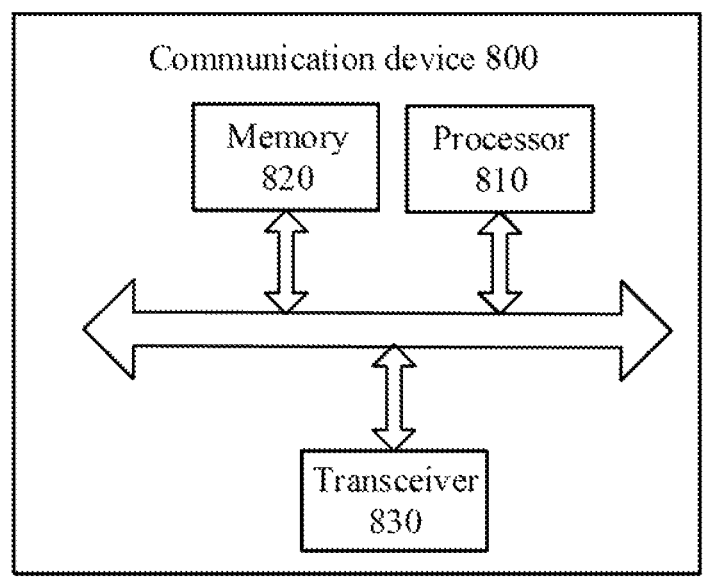
FIG. 8 illustrates a block diagram of a communication device according to an embodiment of the present disclosure.

FIG. 8 illustrates a schematic structural diagram of a communication device 800 according to an embodiment of the present disclosure. The communication device 400 illustrated in FIG. 8 may be a UE, and includes a processor 810, and the processor 810 may call a computer program from a memory and run the computer program to implement the method in the embodiments of the present disclosure.

Alternatively, as illustrated in FIG. 8, the communication device 800 may further include a memory 820. The processor 810 can call a computer program from the memory 820 and run the computer program to implement the method in the embodiments of the present disclosure.

The memory 820 may be a separate device independent of the processor 810, or may be integrated in the processor 810.

Alternatively, as illustrated in FIG. 8, the communication device 800 may further include a transceiver 830, and the processor 810 may control the transceiver 830 to communicate with other devices, specifically, may send information or data to other devices, or receive other information or data sent by the device.

The transceiver 830 may include a transmitter and a receiver. The transceiver 830 may further include antennas, and the number of antennas may be one or more.

Alternatively, the communication device 800 may specifically be a network device according to an embodiment of the present disclosure, and the communication device 800 may implement the corresponding process implemented by the network device in each method of the embodiment of the present disclosure.

Alternatively, the communication device 800 may specifically be a mobile terminal/UE according to an embodiment of the present disclosure, and the communication device 800 may implement the corresponding process implemented by the mobile terminal/UE in each method of the embodiment of the present disclosure. For simplicity, the description will not be repeated here.

Figure 9:
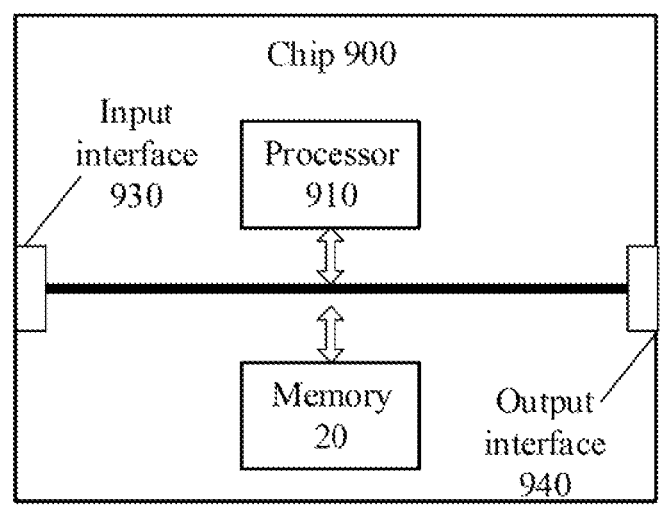
FIG. 9 illustrates a block diagram of a chip according to an embodiment of the present disclosure.

FIG. 9 illustrates a block diagram of a chip according to an embodiment of the present disclosure. As illustrated in FIG. 9, the chip 900 includes a processor 910. The processor 910 may call and execute the computer programs in a memory to execute the method in the embodiments of the present disclosure.

In at least one embodiment, as illustrated in FIG. 9, the chip 900 may further include a memory 920. The processor 910 may call and execute the computer programs in the memory 920 to execute the method in the embodiments of the present disclosure.

The memory 920 may be a separate device from the processor 910, or may be integrated into the processor 910.

In at least one embodiment, the chip 900 may further include an input interface 930. The processor 910 may control the input interface 930 to communicate with another device or chip. Specifically, the processor 910 may control the input interface 930 to obtain information or data from another device or chip.

In at least one embodiment, the chip 900 may further include an output interface 940. The processor 910 may control the output interface 940 to communicate with another device or chip. Specifically, the processor 910 may control the output interface 940 to send information or data to another device or chip.

In at least one embodiment, the chip may be applied to the network device in the embodiments of the present disclosure. The chip may implement a corresponding process implemented by the network device in each method embodiment of the present disclosure, which will not be elaborated herein for brief description.

In at least one embodiment, the chip may be applied to the mobile terminal/UE in the embodiments of the present disclosure. The chip may implement a corresponding process implemented by the mobile terminal/UE in each method embodiment of the present disclosure, which will not be elaborated herein for brief description.

It is to be understood that in the embodiments of the present disclosure, the chip may also be referred to as a system level chip, a system chip, a chip system or a system-on-chip.

Figure 10:
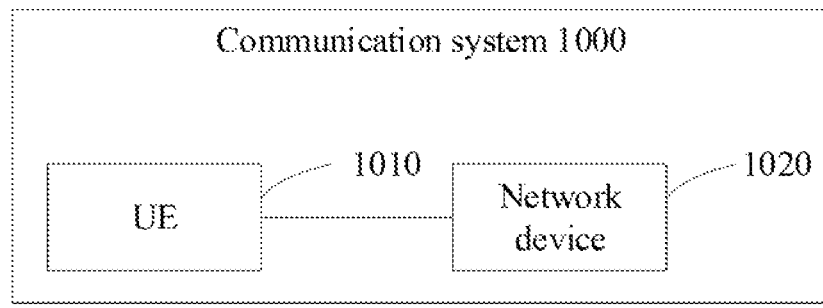
FIG. 10 illustrates a schematic block diagram of a communication system according to an embodiment of the present disclosure.

FIG. 10 illustrates a schematic block diagram of a communication system 1000 according to an embodiment of the present disclosure. As illustrated in FIG. 10, the communication system 1000 includes a UE 1010 and a network device 1020.

The UE 1010 may be configured to implement the corresponding function implemented by the UE in the above method, and the network device 1020 may be configured to implement the corresponding function implemented by the network device in the above method.

Embodiments of the present disclosure provide an information reporting method and apparatus, and a UE.

An embodiment of the present disclosure provides an information reporting method. The method includes the following actions performed by a UE:

receiving first configuration information from a network device, wherein the first configuration information is used for determining configuration of N reference signals, and N is an integer greater than 1; and measuring the N reference signals based on the first configuration information;

selecting at least one reference signal from the N reference signals; and reporting information related to each of the at least one reference signal, wherein the information related to each of the at least one reference signal comprises a first power back-off value.

An embodiment of the present disclosure provides an information reporting method. The method includes the following actions performed by a UE:

receiving second configuration information from a network device, wherein the second configuration information is used for determining configuration of M sounding reference signal (SRS) resources, and M is an integer greater than 1; and reporting information related to a first SRS resource of the M SRS resources, wherein the information related to the first SRS resource comprises a first power back-off value.

An embodiment of the present disclosure provides an information reporting apparatus, applied to a user equipment (UE), the apparatus includes:

a reception unit, configured to receive first configuration information from a network device, wherein the first configuration information is used for determining configuration of N reference signals, and N is an integer greater than 1; and a measurement unit, configured to measure the N reference signals based on the first configuration information;

a selection unit, configured to select at least one reference signal from the N reference signals; and a reporting unit, configured to report information related to each of the at least one reference signal, wherein the information related to each of the at least one reference signal comprises a first power back-off value.

An embodiment of the present disclosure provides an information reporting apparatus, applied to a user equipment (UE), the apparatus includes:

a reception unit, configured to receive second configuration information from a network device, wherein the second configuration information is used for determining configuration of M sounding reference signal (SRS) resources, and M is an integer greater than 1; and a reporting unit, configured to report information related to a first SRS resource of the M SRS resources, wherein the information related to the first SRS resource comprises a first power back-off value.

An embodiment of the present disclosure provides a user equipment (UE), including a processor and a memory storing a computer program, the processor is configured to call and run the computer program stored in the memory, to execute the method described above.

An embodiment of the present disclosure provides a chip, including: a processor for calling a computer program from a memory and running the computer program, to cause a device installed with the chip to execute the method described above.

An embodiment of the present disclosure provides a computer-readable storage medium for storing a computer program that causes a computer to execute the method described above.

An embodiment of the present disclosure provides a computer program product comprising computer program instructions, the computer program instructions causing a computer to execute the method described above.

An embodiment of the present disclosure provides a computer program that causes a computer to execute the method described above.

By applying the above technical schemes, the UE reports related information to the network device, such that the network device can select a Tx beam that has the best combination of maximally allowed transmit power and pathloss of beam pair link for a PUSCH and PUCCH transmission. Thus, the drawback of bad link quality caused by configuring a Tx beam with good pathloss but large power back-off can be resolved by the proposed method.

It is to be understood that in the embodiments of the present disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the present disclosure may be implemented or executed. The universal processor may be a microprocessor or the processor may also be any related processor and the like. The operations of the methods disclosed in combination with the embodiments of the present disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and performs the operations of the above methods in combination with hardware of the processor.

It may be understood that the memory in the embodiment of the present disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the present disclosure is intended to include but not limited to memories of these and any other suitable type.

The embodiments of the present disclosure also provide a computer-readable storage medium for storing one or more computer programs.

In at least one embodiment, the computer-readable storage medium may be applied in the network device of the embodiments of the present disclosure. The computer programs may enable a processor to perform the corresponding process implemented by the network device in each method embodiment of the present disclosure, which will not be elaborated herein for brevity.

In at least one example, the computer-readable storage medium may be applied in the terminal/mobile terminal of the embodiments of the present disclosure. The computer programs may enable a processor to perform the corresponding process implemented by the terminal/mobile terminal in each method embodiment of the present disclosure, which will not be elaborated herein for brevity.

The embodiments of the present disclosure also provide a computer program product. The computer program product includes one or more computer program instructions.

In at least one embodiment, the computer program product may be applied in the network device of the embodiments of the present disclosure. The computer program instructions may enable a processor to perform the corresponding process implemented by the network device in each method embodiment of the present disclosure, which will not be elaborated herein for brevity.

In at least one example, the computer program product may be applied in the terminal/mobile terminal of the embodiments of the present disclosure. The computer program instructions may enable a processor to perform the corresponding process implemented by the terminal/mobile terminal in each method embodiment of the present disclosure, which will not be elaborated herein for brevity.

The embodiments of the present disclosure also provide a computer program.

In at least one embodiment, the computer program may be applied in the network device of the embodiments of the present disclosure. The computer program, when executed by a processor, enables a processor to perform the corresponding process implemented by the network device in each method embodiment of the present disclosure, which will not be elaborated herein for brevity.

In at least one example, the computer program may be applied in the mobile terminal/UE of the embodiments of the present disclosure. The computer program, when executed by a processor, enables a processor to perform the corresponding process implemented by the mobile terminal/UE in each method embodiment of the present disclosure, which will not be elaborated herein for brevity.

Those of ordinary skill in the art may realize that the units and algorithm operations of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn that specific working processes of the system, device and unit described above may refer to the corresponding processes in the method embodiment and will not be elaborated herein for convenient and brief description.

In some embodiments according to the present disclosure, it is to be understood that the disclosed system, apparatus and method may be implemented in another manner. For example, the apparatus embodiment described above is only schematic, and for example, division of the units is only a logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, the device or the units, and may be electrical and mechanical or in other forms.

The units described as separate parts may or may not be separated physically, and parts displayed as units may or may not be physical units, namely may be located in a same place, or may be distributed among multiple network units. Part or all of the units may be selected according to a practical requirement to achieve the purpose of the solutions of the embodiments.

In addition, each functional unit in each embodiment of the present disclosure may be integrated into a processing unit, each unit may exist physically independently, or two or more units may be integrated into a unit.

When being realized in form of software functional unit and sold or used as an independent product, the function may also be stored in a computer-readable storage medium. Based on such an understanding, part of technical solutions of the present disclosure substantially making contributions to the prior art may be embodied in form of a software product, and the computer software product is stored in a storage medium, including a plurality of instructions which enable a computer device (which may be a personal computer, a server, a network device or the like) to execute all or part of the operations of the method in each embodiment of the present disclosure. The abovementioned storage medium includes: various media capable of storing program codes, such as a U disk, a mobile hard disk, a ROM, a RAM, a magnetic disk or an optical disk.

The above is only the specific embodiments of the present disclosure and not intended to limit the scope of the present disclosure. Any variations or replacements apparent to those skilled in the art within the technical scope disclosed by the present disclosure shall fall within the scope of the present disclosure. Therefore, the scope of the present disclosure shall be subject to the scope of the claims.

The invention claimed is:

1. An information reporting method, comprising:
receiving, by a user equipment (UE), first configuration information from a network device, wherein the first configuration information is used for determining configuration of N reference signals, and N is an integer greater than 1;
measuring, by the UE, the N reference signals based on the first configuration information;
selecting, by the UE, at least one reference signal from the N reference signals; and
reporting, by the UE, information related to each of the at least one reference signal,
wherein the information related to each of the at least one reference signal comprises a first power back-off value;
wherein the information related to each of the at least one reference signal further comprises at least one of the following:
identification information of the reference signal:
a first layer 1-reference signal received power (L1-RSRP) value, which is an L1-RSRP value obtained by measuring the reference signal;
a second L1-RSRP value, which is determined based on the first L1-RSRP value and the first power back-off value: or
a first power header room, which is determined based on the first L1-RSRP value, an energy per resource element (EPRE) of the reference signal, a UE configured maximum output power and the first power back-off value;
wherein the second L1-RSRP value is determined based on the following formula;

$$RSRP_{scaled} = RSRP - \Delta P$$

wherein $RSRP_{scaled}$ is the second L1-RSRP value, RSRP is the first L1-RSRP value and $\Delta P$ is the first power back-off value;
wherein the at least one reference signal comprises K reference signals, where K is an integer greater than 1 and less than or equal to N; and among the K reference signals, a first L1-RSRP value of a first reference signal is maximum; and
wherein reporting, by the UE, information related to each of the at least one reference signal comprises:
reporting, by the UE, identification information, the first L1-RSRP value, and a first power header room of the first reference signal, and identification information, first L1-RSRP differential values, and the first power header rooms of K-1 reference signals of the K reference signals other than the first reference signal, wherein the first L1-RSRP differential value of the reference signal and the first L1-RSRP value of the first reference signal are used for determining the first L1-RSRP value of the reference signal.

2. The method of claim 1, wherein the first power back-off value is applied to a first transmit beam of the UE, wherein the first transmit beam of the UE corresponds to a first receive beam of the UE, and the first receive beam of the UE is used for receiving and measuring the reference signal.

3. The method of claim 1, wherein the first power header room is determined based on the following formula:

$$PHR_{hypothetical} = P_{CMAX} - \Delta P - \{P_O + \alpha \times PL + f\}$$

where $PHR_{hypothetical}$ is the first power header room, $P_{CMAX}$ is a UE configured maximum output power, $\Delta P$ is the first power back-off value, $P_O$ is a nominal power level configured to the UE, PL is a path loss determined based on the first L1-RSRP value, α is a scaling factor of the path loss, and f is a power control adjustment state.

4. The method of claim 1, wherein the first power header room is determined based on the following formula:

$$PHR_{hypothetical} = P_{CMAX} - \Delta P - \{P_O + 10\log_{10}(2^\mu M_{RB}) + \alpha \times PL + f\}$$

where $PHR_{hypothetical}$ is the first power header room, $P_{CMAX}$ is a UE configured maximum output power, ΔP is the first power back-off value, $P_O$ is a nominal power level configured to the UE, PL is a path loss determined based on the first L1-RSRP value, α is a scaling factor of the path loss, f is a power control adjustment state, $M_{RB}$ is a reference bandwidth of uplink resource assignment, and μ is reference subcarrier spacing (SCS) configuration.

5. The method of claim 1, wherein the reference signal is a channel state information-reference signal (CSI-RS) or a synchronization signal/primary broadcast channel (SS/PBCH).

6. A user equipment (UE), comprising: a processor and a memory storing a computer program, the processor is configured to call and run the computer program stored in the memory, to
receive first configuration information from a network device, wherein the first configuration information is used for determining configuration of N reference signals, and N is an integer greater than 1; and
measure the N reference signals based on the first configuration information;
select at least one reference signal from the N reference signals; and
report information related to each of the at least one reference signal,
wherein the information related to each of the at least one reference signal comprises a first power back-off value;
wherein the information related to each of the at least one reference signal further comprises at least one of the following:
identification information of the reference signal;
a first layer 1-reference signal received power (L1-RSRP) value, which is an L1-RSRP value obtained by measuring the reference signal;
a second L1-RSRP value, which is determined based on the first L1-RSRP value and the first power back-off value; or
a first power header room, which is determined based on the first L1-RSRP value, an energy per resource element (EPRE) of the reference signal, a UE configured maximum output power, and the first power back-off value;
wherein the second L1-RSRP value is determined based on the following formula;

$$RSRP_{scaled} = RSRP - \Delta P$$

wherein $RSRP_{scaled}$ is the second L1-RSRP value, RSRP is the first L1-RSRP value. and ΔP is the first power back-off value;
wherein the at least one reference signal comprises K. reference signals, where K is an integer greater than 1 and less than or equal to N; and among the K reference signals, a first L1-RSRP value of a first reference signal is maximum; and
wherein the processor is configured to report identification information, the first L1-RSRP value, and a first power header room of the first reference signal, and identification information, first L1-RSRP differential values, and the first power header rooms of K-1 reference signals of the K reference signals other than the first reference signal, wherein the first L1-RSRP differential value of the reference signal and the first L1-RSRP value of the first reference signal are used for determining the first L1-RSRP value of the reference signal.

7. The UE of claim 6, wherein the first power back-off value is applied to a first transmit beam of the UE, wherein the first transmit beam of the UE corresponds to a first receive beam of the UE, and the first receive beam of the UE is used for receiving and measuring the reference signal.

8. The UE of claim 6, wherein the first power header room is determined based on the following formula:

$$PHR_{hypothetical} = P_{CMAX} - \Delta P - \{P_O + \alpha \times PL + f\}$$

where $PHR_{hypothetical}$ is the first power header room, $P_{CMAX}$ is a UE configured maximum output power, ΔP is the first power back-off value, Po is a nominal power level configured to the UE, PL is a path loss determined based on the first L1-RSRP value, α is a scaling factor of the path loss, and f is a power control adjustment state.

9. The UE of claim 6, wherein the first power header room is determined based on the following formula:

$$PHR_{hypothetical} = P_{CMAX} - \Delta P - \{P_O + 10\log_{10}(2^\mu M_{RB}) + \alpha \times PL + f\}$$

where $PHR_{hypothetical}$ is the first power header room, $P_{CMAX}$ is a UE configured maximum output power, ΔP is the first power back-off value, $P_O$ is a nominal power level configured to the UE, PL is a path loss determined based on the first L1-RSRP value, α is a scaling factor of the path loss, f is a power control adjustment state, $M_{RB}$ is a reference bandwidth of uplink resource assignment, and u is reference subcarrier spacing (SCS) configuration.

10. The UE of claim 6, wherein the reference signal is a channel state information-reference signal (CSI-RS) or a synchronization signal/primary broadcast channel (SS/PBCH).

11. An information reporting method, comprising:
receiving, by a user equipment (UE), first configuration information from a network device, wherein the first configuration information is used for determining configuration of N reference signals, and N is an integer greater than 1;
measuring, by the UE, the N reference signals based on the first configuration information;
selecting, by the UE, at least one reference signal from the N reference signals; and
reporting, by the UE, information related to each of the at least one reference signal, wherein the information related to each of the at least one reference signal comprises a first power back-off value;
wherein the information related to each of the at least one reference signal further comprises at least one of the following:
identification information of the reference signal;
a first layer 1-reference signal received power (L1-RSRP) value, which is an L1-RSRP value obtained by measuring the reference signal;
a second L1-RSRP value, which is determined based on the first L1-RSRP value and the first power back-off value; or
a first power header room, which is determined based on the first L1-RSRP value, an energy per resource element (EPRE) of the reference signal, a UE configured maximum output power, and the first power back-off value;

wherein the second L1-RSRP value is determined based on the following formula:

$$RSRP_{scaled} = RSRP = \Delta P$$

wherein $RSRP_{scaled}$ is the second L1-RSRP value, RSRP is the first L1-RSRP value, and $\Delta P$ is the first power back-off value;

wherein the at least one reference signal comprises K reference signals, where K is an integer greater than 1 and less than or equal to N; and among the K reference signals, a second L1-RSRP value of a first reference signal is maximum; and wherein reporting, by the UE, information related to each of the at least one reference signal comprises:

reporting, by the UE, identification information and the second L1-RSRP value of the first reference signal, and identification information and second L1-RSRP differential values of K-1 reference signals of the K reference signals other than the first reference signal, wherein the second L1-RSRP differential value of the reference signal and the second L1-RSRP value of the first reference signal are used for determining the second L1-RSRP value of the reference signal.

\* \* \* \* \*